(12) United States Patent
Jablonski

(10) Patent No.: US 9,806,480 B1
(45) Date of Patent: Oct. 31, 2017

(54) BUILDING WIRING SYSTEM, COMPONENTS AND METHODS

(71) Applicant: Jerome Jablonski, Ashley, IL (US)

(72) Inventor: Jerome Jablonski, Ashley, IL (US)

( * ) Notice: Subject to any disclaimer, the term of this patent is extended or adjusted under 35 U.S.C. 154(b) by 0 days.

(21) Appl. No.: 15/362,647

(22) Filed: Nov. 28, 2016

(51) Int. Cl.
*H01R 13/60* (2006.01)
*H01R 25/16* (2006.01)
*H01R 43/26* (2006.01)

(52) U.S. Cl.
CPC ......... *H01R 25/162* (2013.01); *H01R 25/165* (2013.01); *H01R 43/26* (2013.01)

(58) Field of Classification Search
CPC .... H01R 31/08; H01R 13/518; H01R 25/006; H01R 31/06; H01R 31/02; H01R 4/64; H02G 3/088; H02G 3/18; H02G 3/20; H02G 3/14; H02G 3/185
USPC ..... 439/507, 534, 535, 650–652; 174/50–51, 174/53–57
See application file for complete search history.

(56) References Cited

U.S. PATENT DOCUMENTS

| | | | | | |
|---|---|---|---|---|---|
| 3,621,112 | A | * | 11/1971 | Stickley | H05K 3/306 174/50.52 |
| 5,122,069 | A | * | 6/1992 | Brownlie | G02B 6/4451 174/53 |
| 5,285,011 | A | * | 2/1994 | Shimochi | H01H 85/2035 174/138 F |
| 5,735,710 | A | * | 4/1998 | Blaauboer | H01R 9/2458 439/535 |
| 6,147,304 | A | * | 11/2000 | Doherty | H02G 3/126 174/481 |
| 6,585,541 | B2 | * | 7/2003 | Higashida | H01H 85/2045 337/186 |
| 6,786,766 | B1 | * | 9/2004 | Chopra | H01R 4/4827 439/441 |
| 7,094,073 | B2 | * | 8/2006 | Obata | H01R 13/514 439/507 |
| 7,754,967 | B2 | * | 7/2010 | Kruse | H02G 3/18 174/481 |
| 8,013,243 | B2 | * | 9/2011 | Korcz | H02G 3/126 174/481 |
| 8,680,394 | B2 | * | 3/2014 | Korcz | H02G 3/086 174/58 |
| 8,921,694 | B2 | * | 12/2014 | Moss | H02G 3/16 174/481 |
| 9,018,525 | B1 | * | 4/2015 | Shotey | H02G 3/126 174/53 |

* cited by examiner

*Primary Examiner* — Thanh Tam Le
(74) *Attorney, Agent, or Firm* — RG Patent Consulting, LLC; Rachel Gilboy

(57) ABSTRACT

The building electrical wiring system includes a component box to attach to a wall frame, and a current plate configured to be mounted at a back of the component box having a plurality of receiving slots corresponding respectively to hot, neutral and ground. A component device, such as a switch, includes internal component circuitry terminating in a plurality of conductor stems to insert into a respective receiving slot of the current plate. An electrical jumper bar includes an insulated conductor extending between opposite ends which include a respective prong for each conductive path and configured to electrically couple the current plate to another current plate associated with another component device.

10 Claims, 4 Drawing Sheets

BUILDING WIRING SYSTEM, COMPONENTS AND METHODS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of building wiring and more specifically relates to a building wiring system, components and method.

2. Description of the Related Art

Building wiring is the electrical wiring and associated components such as junction boxes, switches, outlets, meters and fixtures, such as lights and fans, used in buildings or other structures. Electrical wiring typically uses insulated conductors.

Cable/wire installation is a labor intensive and time consuming process that may require electricians of various skill levels. Generally, the process includes several phases. The first phase is commonly referred to as the rough-in stage. The second stage may be referred as the termination phase.

During the second stage the cables/wires are installed throughout the structure as per switch or outlet plans and after the cables/wires installation the electrical wires are connected to the electrical wiring devices. Accordingly, each insulated electrical wire is stripped and connected to the terminals of the electrical device.

Presently, when it is desired to locate electrical outlets, and/or electrical control modules such as switches, rheostats, or any other similar electrical control module that monitors or controls the flow of electricity, within a wall or partition, an electrician typically installs electrical boxes (also known as component or junction boxes) within the wall frame. Each electrical box is typically installed on wall structural supports, e.g. wall studs. Electrical outlets are sometimes referred to as electrical sockets or receptacles, but may be referred to as electrical outlets herein. Electrical switches and outlets may be referred to as component or junction devices. Electrical fixtures may refer to lights, fans or any other fixture controlled by a switch.

Furthermore, at least some electrical codes require the electrician to install pigtails on each outlet and control module, which are then connected to the incoming power source, e.g. the electrical wiring network, with electric wire nuts. The installation of pigtails is labor intensive and increases the material costs of installing outlets and control modules.

In prior systems for installation of cables/wires, the termination phase of the installation process is the most time consuming portion of the process, and hence, the most costly. A journeyman electrician must perform or supervise the termination of each wiring device. A few examples of such are set forth in: U.S. Pat. No. 5,762,525 A, US Pat. App. No. US 2003/0209358 A1 and US Pat. App. No. US 2009/0035989 A1.

U.S. Pat. No. 5,762,525 A to Candeloro is directed to an electrical wiring system for conducting electricity through an insulated casing. The electrical wiring system includes a substantially rigid conducting line having an insulating casing and a plurality of electrical conducting cells embedded in the insulating casing, each conducting cell comprising a metal conductor, and a substantially rigid connector for connecting to the conducting line, the connector comprising an insulating sheath and a plurality of insulated electrical conducting metal through-prongs recessed within the insulating sheath. The insulating casing and the connector plug-in to each other without hard-wiring. The electrical wiring system includes additional plug-in components such as electrical receptacle boxes and switches, corner adapters and power adapters which extend the system without hard wiring.

US Patent Application No. US 2003/0209358 to Kruse et al. is directed to a system for accessing an electrical wiring network from opposing sides of a wall. The wall includes at least one structural support and a wall surface. The system includes an electrical box having a perimeter wall and two open sides. The open sides are located at opposing ends of the perimeter wall, thereby defining a passageway through the electrical box. Additionally, the system includes a pair of frames coupled to the electrical box at the open sides, and at least two electrical outlets coupled to the frames. Each outlet includes a plurality of integral conductor leads extending therefrom.

US Patent Application No. US 2009/0035989 to Savicki et al. is directed to an electrical wiring system that includes a plug connector having plug contacts configured to terminate a plurality of wires. The system also includes an electrical wiring device having a cover member, a body member, a ground strap assembly disposed between the cover member and the body member, and a receptacle formed in a rear portion of the body member, the receptacle being configured to accept the plug connector. The ground strap assembly is configured to conform to at least one body member feature such that a distance from the ground strap assembly to a major rear surface of the body member is less than a predetermined distance. The receptacle includes a plurality of receptacle contacts configured to mate with the plurality of plug contacts when the plug connector is inserted into the receptacle.

None of the above inventions and patents, taken either singly or in combination, are seen to disclose an approach including the use of a current plate and jumpers for easy installation of cables/wires.

BRIEF SUMMARY OF THE INVENTION

In view of the foregoing disadvantages inherent in the known electrical wiring art, the present invention provides a novel approach for wiring. The general purpose of the present invention, which will be described subsequently in greater detail is to provide an efficient, labor saving, safer and cost-effective system for terminating electrical devices to the electrical wiring system.

Another intent of the present embodiments is to provide a cable/wire installation system and method that reduces the fire hazard and possible shock to the installer and also increases the installation efficiency by simplifying the installation process of junction or component devices such as switches and outlets.

An embodiment is directed to a building electrical wiring system comprising a component box including an attachment mechanism configured to attach the component box to a wall frame of a building, and a current plate configured to be mounted at a back of the component box and further including a dielectric substrate having a plurality of receiving slots therein, corresponding respectively to at least hot, neutral and ground, and facing into the component box from the back thereof. A component device includes a fastener mechanism configured to fasten the component device to a front of the component box and includes internal component circuitry terminating in a plurality of conductor stems each configured to insert into a respective receiving slot of the current plate. An electrical jumper bar includes an insulated conductor having a plurality of conductive paths extending between opposite ends which include a respective prong for each conductive path and configured to electrically couple the current plate to another current plate associated with another component device. The current plate has a plurality of rows of connector holes in a top surface of the dielectric substrate, wherein a respective connector hole of each of the plurality of rows is electrically coupled to a respective receiving slot and corresponds respectively to at least hot, neutral and ground, wherein a first row of the plurality of holes is configured to receive stripped ends of feed wires, a second row is configured to receive prongs of the electrical jumper bar, and a third row is configured to receive stripped ends of load wires.

In various embodiments, the component box may be a switch box, and the component device may be a switch. Alternatively, the component box may be an outlet box, and the component device may be an outlet.

In some embodiments, a mounting mechanism may comprise a snap fit mounting mechanism configured to removably mount the current plate to the back of the component box.

Also, the current plate and the component device may be color coded to indicate proper association with each other.

In various embodiments, the opposite ends of the electrical jumper bar may be rigid plastic ends and the insulated conductor comprises an insulated cable with the prongs extending from the rigid plastic ends transversely to the insulated cable. Also, the rigid plastic ends may be laterally offset from the insulated cable.

The dielectric substrate of the current plate may be a rigid plastic substrate. Also, the connector holes may include an associated spring loaded clamp to define a stab-in connection with the feed wires, prongs and load wires. In certain embodiments, the feed wires, prongs and load wires are configured to be released from the spring loaded clamp with a current plate key.

A method aspect is directed to electrically wiring a building, the method comprising: attaching a component box to a wall frame of a building; mounting a current plate to a back of the component box, the current plate including a dielectric substrate having a plurality of receiving slots therein, corresponding respectively to at least hot, neutral and ground, and facing into the component box from the back thereof, the current plate further comprising a plurality of rows of connector holes in a top surface of the dielectric substrate, wherein a respective connector hole of each of the plurality of rows is electrically coupled to a respective receiving slot and corresponds respectively to at least hot, neutral and ground, wherein a first row of the plurality of holes is configured to receive stripped ends of feed wires, and a third row is configured to receive stripped ends of load wires; fastening a component device to a front of the component box, the component device including internal component circuitry terminating in a plurality of conductor stems each being inserted into a respective receiving slot of the current plate; and electrically coupling the current plate to another current plate associated with another component device using an electrical jumper bar including an insulated conductor having a plurality of conductive paths extending between opposite ends which include a respective prong for each conductive path and are inserted into a second row of the plurality of rows of connector holes of the current plate.

The present invention holds significant improvements and serves as an efficient, labor saving, and cost-effective system for terminating electrical devices to the electrical wiring system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, building wiring system, components and methods constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a building wiring systems, components and methods and more particularly to an approach to wiring a building using the components described below to improve the efficiency of installation while reducing fire hazards and reducing possible shock.

Generally speaking, metal or molded electrical boxes designed for nail or screw attachment to wooden beams or studs are well known in the construction industry. They come in rectangular shapes for one gang to many gangs; they are also available as round boxes.

Electrical boxes have been produced for many years in a variety of shapes and dimensions to accommodate various electrical devices such as switches, connectors and receptacles. The electrical boxes require a suitable mounting member for coupling the electrical device to the box. Electrical boxes have a tab or flange with a threaded hole for receiving mounting screws for mounting the electrical device directly to the box.

Electrical boxes are commonly made of metal that can be stamped as a one-piece unit or formed from different components that can be ganged and assembled to the desired dimensions. Electrical boxes are also made of plastic.

Typically, an electrician routes wires from the circuit breaker box to the individual electrical boxes, and wires are also routed between the individual electrical boxes. Then, the exposed ends of individual wires positioned within the electrical boxes are connected with a wire nut.

After inspection and drywall installation, the electrician moves from electrical box to electrical box, attaching component devices (e.g., switches and outlets) to the wires. Cover plates are manually installed over the electrical devices.

This typical approach is time consuming and electrical system installation can be very expensive. Labor costs associated with such installation are high as compared to labor costs associated with unskilled labor. Further, connecting and/or splicing wires using wire nuts may leave conductive material of the wires exposed. This condition may go unnoticed by the electrician during initial electrical testing, but may become worse over time. Since the wires inside the junction boxes lie in close proximity, a short circuit or even a fire may result. So, it can be seen that this typical approach of electrical system installation can result in unfit and unsafe electrical connections.

In addition, the electrical boxes typically contain a plurality of wires, and the number of wires only increases when the circuitry is more complex, as in the case of 3-way or 4-way switched circuits. As the number of wires increases, the possibility that the electrician might incorrectly interconnect or splice the wires increases.

Referring now to FIGS. 1-5, a building wiring system and components will be described and which provide an efficient, labor saving, safer and cost-effective approach for terminating electrical devices to the electrical wiring system.

Figure 1:
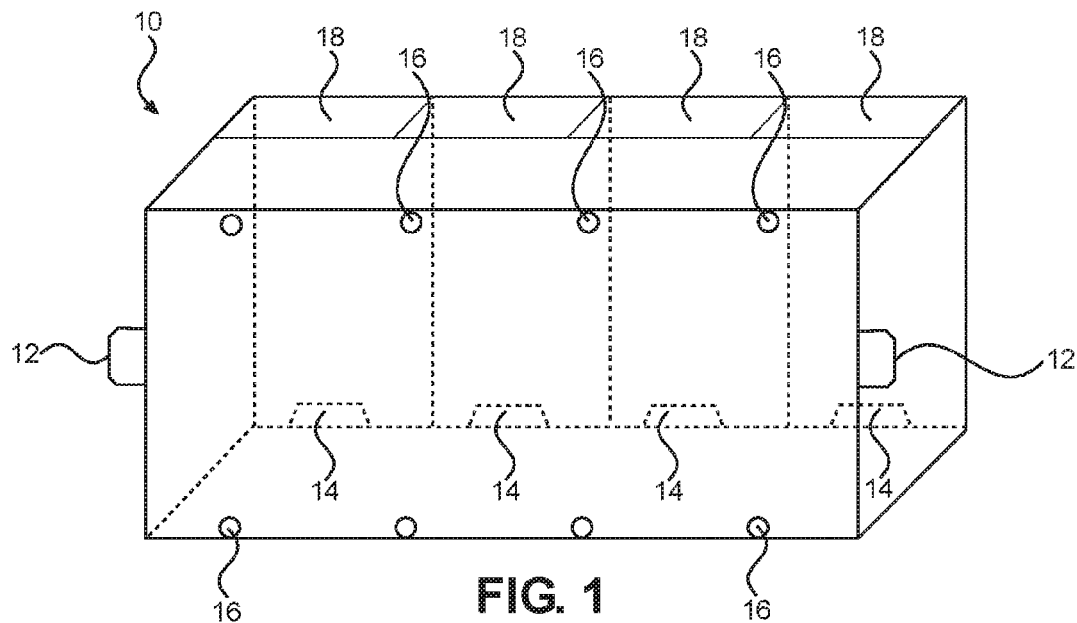
FIG. 1 shows a perspective view illustrating an electrical component box of a building wiring system according to an embodiment of the present invention.

Referring to the drawings by reference numerals there is shown in FIG. 1, an electrical component box 10 of a building wiring system according to an embodiment of the present invention. The component box 10 includes an attachment mechanism, shown here as flanges 12 for use with a fastener such as a nail or screw, and configured to attach the component box 10 to a wall frame of a building. The component box 10 may be plastic or metal. The component box 10 includes rear slots 18 and may include associated snap fit tabs 14 which define a mounting mechanism for current plates, as will be described below. As such, the component box 10 may be referred to as a "quick box."

Fastener holes 16 are included to receive a fastener such as a screw to mount an electrical component such as a switch or outlet.

As illustrated, the component box 10 is a multi-gang or four-gang component box but it will be appreciated that other sized boxes such as a two-gang box and single box are also contemplated. In other words, as shown, the component box 10 can receive four electrical component devices such as switches, dimmers, outlets etc. The component box 10 mounts to the wall frame the same as the conventional design and can be made of metal or plastic depending on local building codes.

Figure 2:
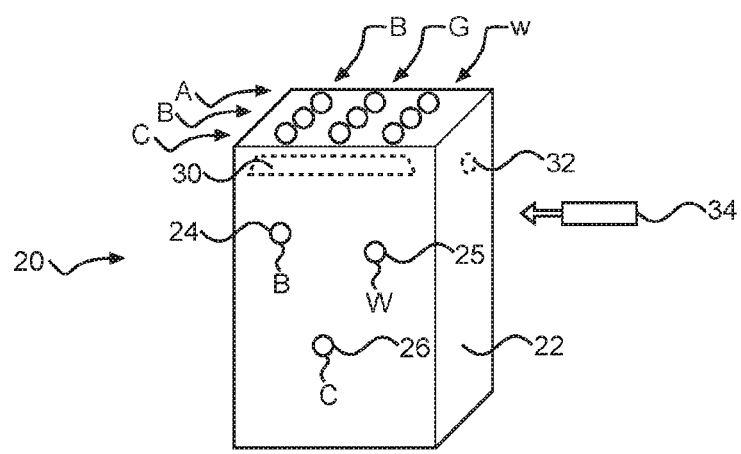
FIG. 2 is a perspective view illustrating a current plate of a building wiring system according to an embodiment of the present invention.

Referring now to FIG. 2, a current plate 20 is configured to be mounted at a back of the component box 10. In other words, it is dimensioned to be positioned in the slot 18 at the rear of the component box 10. The current plate 20 includes a dielectric substrate 22 or body with conductive traces (e.g. copper traces) patterned within. The dielectric substrate 22 (or non-conductive body) may be a rigid plastic.

The current plate 20 has a plurality of receiving slots 24, 25, 26 on a front face thereof. These receiving slots 24, 25, 26 corresponding respectively to at least hot, neutral and ground, and may be labeled black, white and green respectively. When the current plate is mounted in the slot 18 of the component box 10, the receiving slots 24, 25, 26 face into the component box 10 from the back thereof.

The routing of the conductive traces is formed according to a pre-determined circuit layout such that different electrical component devices, such as switches, dimmers, outlets etc., can be associated with respective current plates 20 that may have the same or different conductive trace patterns as needed.

The current plate 20 has a plurality of rows A, B, C of connector holes 28 in a top surface of the dielectric substrate 22. A respective connector hole 28 of each of the plurality of rows A, B, C is electrically coupled, via a conductive trace, to a respective receiving slot 24, 25, 26 and corresponds respectively to at least hot, neutral and ground, which again may be labeled black, white and green respectively. For example, a first row A of the plurality of connector holes 28 is configured to receive stripped ends of feed wires, a second row B is configured to receive prongs of an electrical jumper bar (described below), and a third row C is configured to receive stripped ends of load wires (e.g. to a light or fan etc.).

In some embodiments, the connector holes 28 may include an associated spring loaded clamp 30 (e.g. a biased metal rod with barbs as would be appreciated by those skilled in the art) to define a stab-in connection with the feed wires, prongs and load wires. In certain embodiments, the feed wires, prongs and load wires are configured to be released from the spring loaded clamp 30 via a key hole 32 and the use of a current plate key 34. Positioning of the key hole 32 and clamp 30 may vary with design parameters.

Figure 3A:
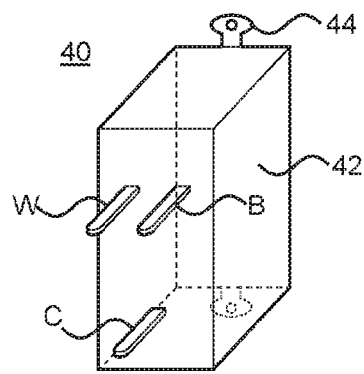
FIG. 3A is a perspective front view illustrating an example of a component device of the building wiring system according to an embodiment of the present invention.
Figure 3B:
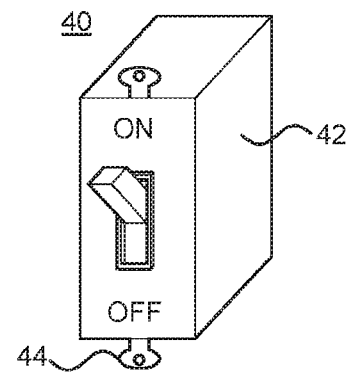
FIG. 3B is a perspective rear view illustrating an example of a component device of the building wiring system according to an embodiment of the present invention.

Referring additionally to FIGS. 3A and 3B, a component device 40 (e.g. shown here as a switch) includes a housing 42 (plastic and/or metal) and a fastener mechanism 44, such as a screw flange, configured to fasten the component device 40 to a front of the component box 10 at the screw holes 16. The component device 40 includes internal component circuitry (e.g. switch circuitry) terminating in a plurality of conductor stems 46 each configured to insert into a respective receiving slot 24, 25, 26 of the current plate 20. The stems 46 corresponds respectively to at least hot, neutral and ground, which may be labeled black, white and green respectively. The stems 46 may be may be steel with copper coating.

In various embodiments, the component box 10 may be a switch box, and the component device 40 may be a switch, for example. Alternatively, the component box 10 may be an outlet box, and the component device 40 may be an outlet, for example.

Figure 4:
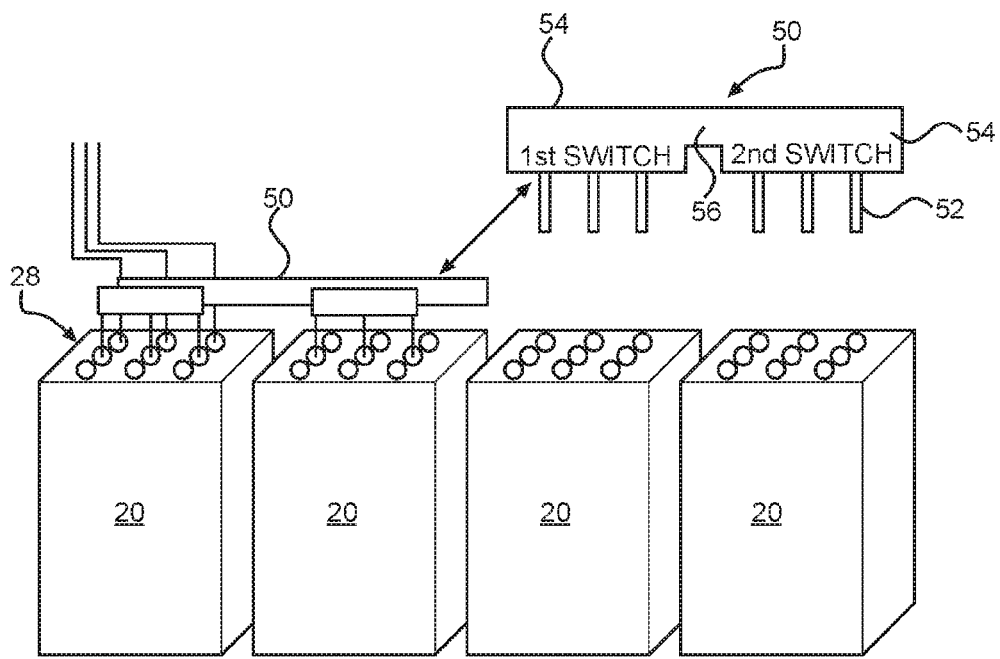
FIG. 4 is a perspective view illustrating an example of multiple current plates and an associated jumper bar of the building wiring system according to an embodiment of the present invention.

Referring additionally to FIG. 4, an electrical jumper bar 50 includes an insulated conductor 56 having a plurality of conductive paths extending between opposite ends 54 which include a respective prong 52 for each conductive path. The jumper bar 50 is configured to electrically couple the current plate 20 to another current plate 20 associated with another component device 40. Thus, multiple component devices 40 can be fed from the breaker panel with the same feed line. The prongs 52 may be may be steel with copper coating. The jumper bar 50 may be provided in various lengths and may also include more than two connectors so that three or more component devices 40 may be jumped together if needed.

In various embodiments, the opposite ends 54 of the electrical jumper bar 50 may be rigid plastic ends and the insulated conductor comprises an insulated cable with the prongs 52 extending from the rigid plastic ends 54 transversely to the insulated cable. Also, the rigid plastic ends 54 may be laterally offset from the insulated cable 56 so as to provide access to a row B of connector holes 28 in an intervening current plate 20.

In some embodiments, the mounting mechanism defined by slots 18 and tabs 14 may comprise a snap fit mounting mechanism configured to removably mount the current plate 20 to the back of the component box 10.

Also, the current plates 20 and the component devices 40 may be color coded to indicate proper association with each other. For example: a green single pole switch will only insert into a green current plate. A purple 4-way switch will not insert into the green current plate. The arrangement and number of prongs 46 in the back of the switch may vary with the color of the switch and current plate.

Figure 5:
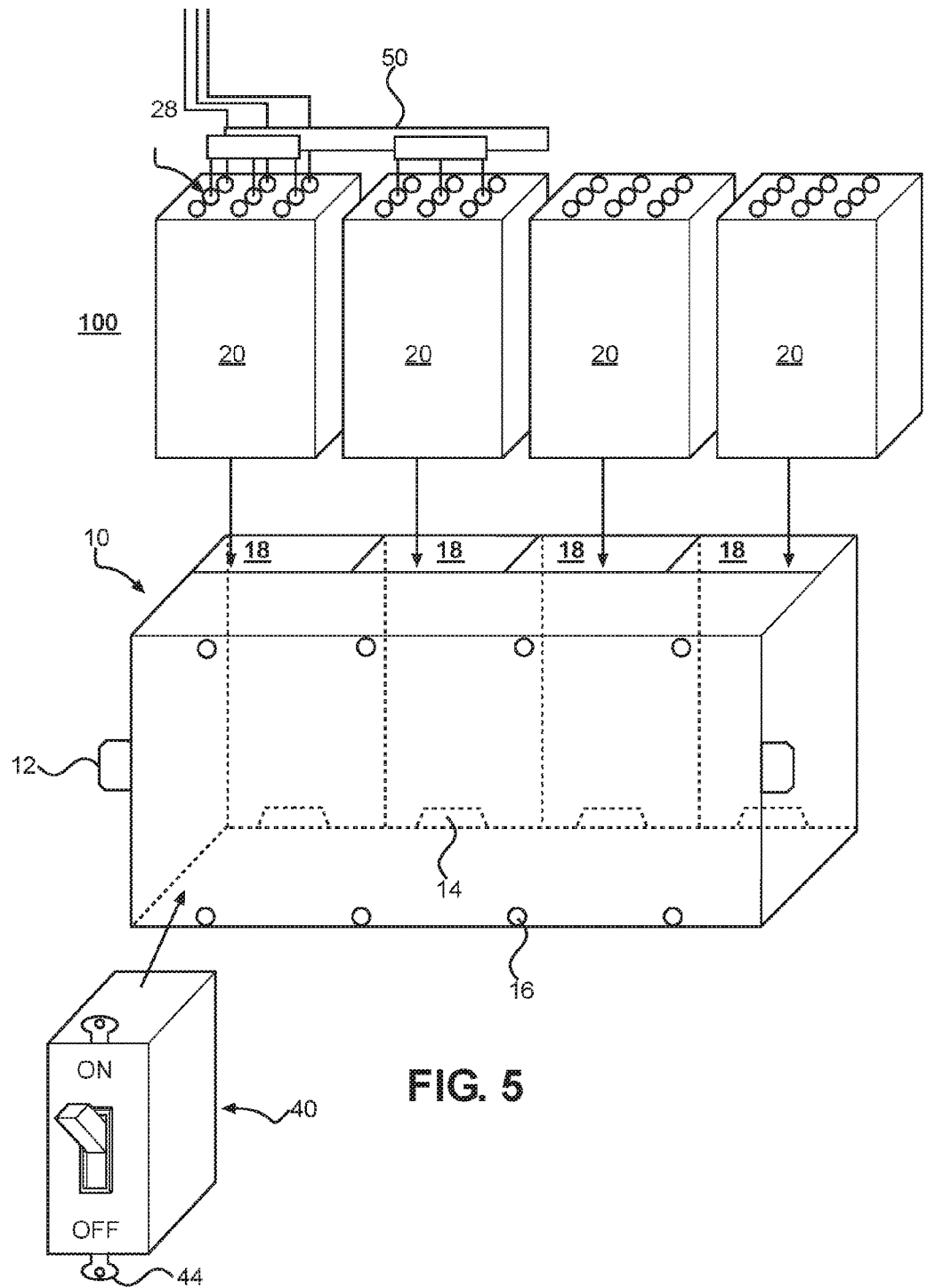
FIG. 5 is a perspective view illustrating various components of the building wiring system according to an embodiment of the present invention.
Figure 6:
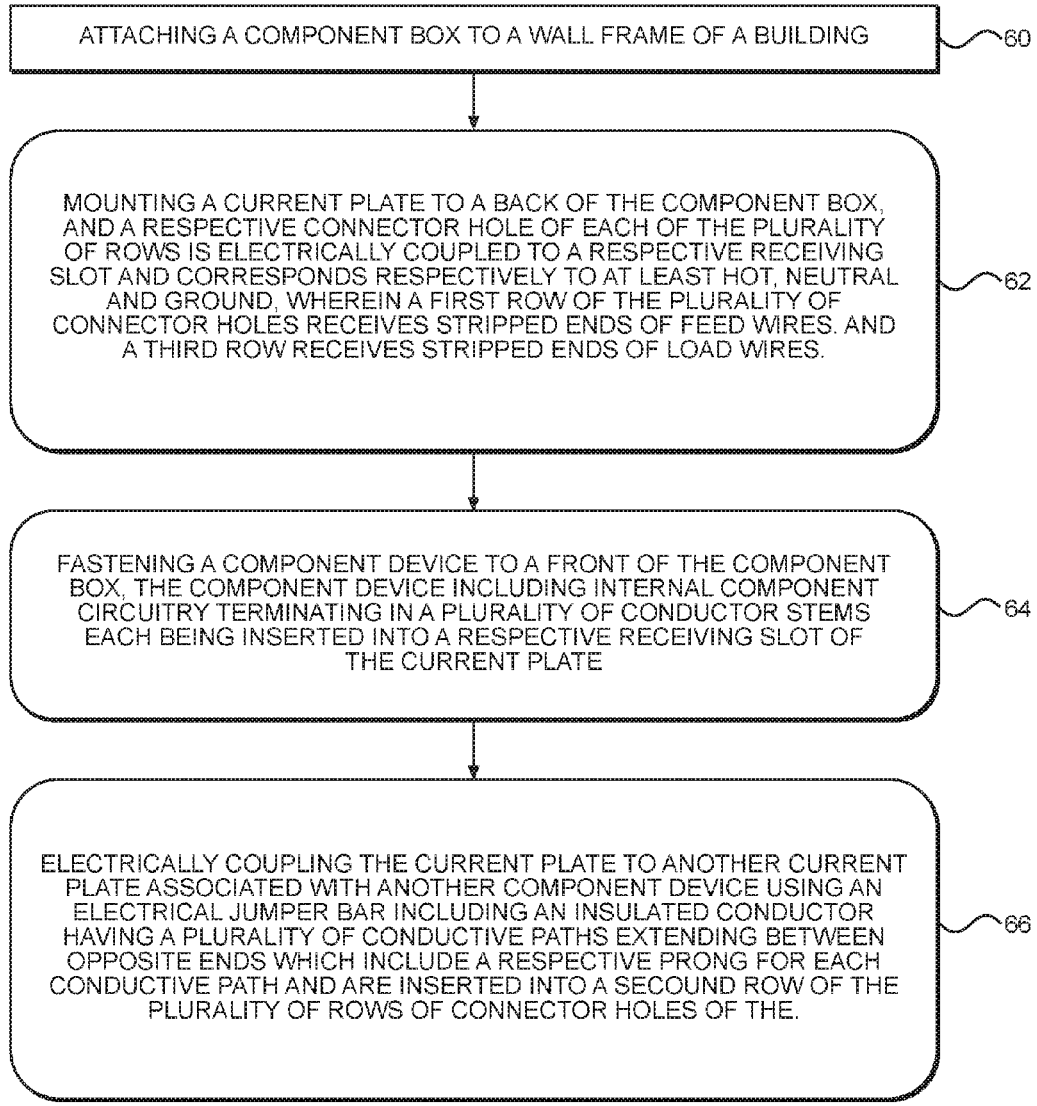
FIG. 6 is a flowchart illustrating a method of wiring a building according to an embodiment of the present invention of FIGS. 1-5.

Referring now additionally to FIGS. 5 and 6, a method aspect is directed to electrically wiring a building. The method includes (at block 60) attaching a component box 10 to a wall frame of a building; (block 62) mounting a current plate 20 to a back of the component box 10, the current plate 20 including the plurality of receiving slots 24, 25, 26 therein, corresponding respectively to at least hot, neutral and ground, faces into the component box 10 from the back thereof, wherein a respective connector hole 28 of each of the plurality of rows A, B, C is electrically coupled to a respective receiving slot and corresponds respectively to at least hot, neutral and ground, wherein a first row A of the plurality of connector holes 28 is configured to receive stripped ends of feed wires, and a third row C is configured to receive stripped ends of load wires; (block 64) fastening a component device 40 to a front of the component box 10 with the plurality of conductor stems 46 each being inserted into a respective receiving slot 24, 25, 26 of the current plate 20; and (block 66) electrically coupling the current plate 20 to another current plate 20 associated with another component device 40 using an electrical jumper bar 50 including a respective prong 52 for each conductive path being inserted into the second row B of the plurality of rows of connector holes 28 of the current plate 20.

Accordingly, a person will be successful in using the building wiring system 100 by: 1) installing switch box 12 to stud in wall; 2) identifying proper current plate 20; 3) stripping wires of feed wire and insert into top back row of current plate 20; 4) stripping wires of load device and inserting into front row of current plate 20; 5) snapping current plate 20 in slot of box 12; 6) inserting proper component device 40 (switch or receptacle); 7) installing a cover plate.

Thus, the embodiments of present invention hold significant improvements and serve as an efficient, labor saving, and cost-effective system and method for terminating electrical devices to an electrical wiring system.

Referring again to FIG. 5, showing building wiring system 100, it is noted that building wiring system 100 may be sold as kit comprising the above described components and at least one set of user instructions. The kit has instructions such that functional relationships are detailed in relation to the structure of the invention (such that the invention can be used, maintained, or the like in a preferred manner). System 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As may be used herein, the terms "substantially" and "approximately" provides an industry-accepted tolerance for its corresponding term and/or relativity between items. Such an industry-accepted tolerance ranges from less than one percent to fifty percent. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the present invention have been expressly described herein, other combinations of these features and functions are likewise possible. The present invention is not limited by the particular examples disclosed herein and expressly incorporates these other combinations.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A building electrical wiring system comprising:
   a component box including an attachment mechanism configured to attach the component box to a wall frame of a building;
   a current plate configured to be mounted at a back of the component box and further including a dielectric substrate having a plurality of receiving slots therein, corresponding respectively to at least hot, neutral and ground, and facing into the component box from the back thereof;
   a component device including a fastener mechanism configured to fasten the component device to a front of the component box and including internal component circuitry terminating in a plurality of conductor stems each configured to insert into a respective receiving slot of the current plate; and
   an electrical jumper bar including an insulated conductor having a plurality of conductive paths extending between opposite ends; wherein each opposite end includes a respective prong for each conductive path and configured to electrically couple the current plate to another current plate associated with another component device;
   the current plate comprising a plurality of rows of connector holes in a top surface of the dielectric substrate, wherein a respective connector hole of each of the plurality of rows is electrically coupled to a respective receiving slot and corresponds respectively to the at least hot, neutral and ground, wherein a first row of the plurality of row of connecting holes is configured to receive stripped ends of feed wires, a second row is configured to receive prongs of the electrical jumper bar, and a third row is configured to receive stripped ends of load wires.

2. The building electrical wiring system of claim 1 wherein said component box comprises a switch box, and said component device comprises a switch.

3. The building electrical wiring system of claim 1 wherein said component box comprises an outlet box, and said component device comprises an outlet.

4. The building electrical wiring system of claim 1 wherein said component box includes a snap fit mounting mechanism configured to removably mount the current plate to the back of the component box.

5. The building electrical wiring system of claim 1 wherein said current plate and said component device are color coded to indicate proper association with each other.

6. The building electrical wiring system of claim 1 wherein the opposite ends of said electrical jumper bar are rigid plastic ends and the insulated conductor comprises an insulated cable with the prongs extending from the rigid plastic ends transversely to the insulated cable.

7. The building electrical wiring system of claim 6 wherein the rigid plastic ends are laterally offset from the insulated cable.

8. The building electrical wiring system of claim 1 wherein said dielectric substrate of the current plate comprises a rigid plastic substrate.

9. The building electrical wiring system of claim 1 wherein said connector holes include an associated spring loaded clamp to define a stab-in connection with said feed wires, prongs and load wires.

10. The building electrical wiring system of claim 9 wherein said feed wires, prongs and load wires are configured to be released from the spring loaded clamp with a current plate key.

* * * * *